United States Patent [19]

Lahiff

[11] 4,142,495
[45] Mar. 6, 1979

[54] ENGINE EXHAUST GAS RECIRCULATION SYSTEM WITH PERIODIC RECALIBRATION OF EXHAUST BACK PRESSURE REFERENCE

[75] Inventor: John E. Lahiff, Farmington, Mich.

[73] Assignee: General Motors Corporation, Detroit, Mich.

[21] Appl. No.: 857,107

[22] Filed: Dec. 5, 1977

[51] Int. Cl.² ............................................. F02B 25/06
[52] U.S. Cl. .................................................. 123/119 A
[58] Field of Search ..................................... 123/119 A

[56] References Cited

U.S. PATENT DOCUMENTS

| | | | |
|---|---|---|---|
| 3,834,366 | 9/1974 | Kingsbury | 123/119 A |
| 4,018,198 | 4/1977 | Williams | 123/119 A |
| 4,031,871 | 6/1977 | Hamanishi | 123/119 A |
| 4,041,917 | 8/1977 | Suzuki | 123/119 A |
| 4,056,084 | 11/1977 | Baumgartner | 123/119 A |
| 4,069,797 | 1/1978 | Nohira et al. | 123/119 A |
| 4,069,798 | 1/1978 | Thornburgh | 123/119 A |
| 4,071,003 | 1/1978 | Aono | 123/119 A |
| 4,090,482 | 5/1978 | Yoshida | 123/119 A |
| 4,092,960 | 6/1978 | Nohira et al. | 123/119 A |
| 4,094,287 | 6/1978 | Nohira | 123/119 A |

*Primary Examiner*—Wendell E. Burns
*Attorney, Agent, or Firm*—Robert M. Sigler

[57] ABSTRACT

A motor vehicle combustion engine has an exhaust gas recirculation system in which the flow of recirculated exhaust gas is controlled through an orifice having exhaust back pressure on one side and a control pressure on the other, determined by an EGR valve. Apparatus is provided for sensing the control pressure and controlling the EGR valve in response to the sensed control pressure, a predetermined desired control pressure and a reference. At selected occurrences of engine idle, the EGR valve is closed and the sensed control pressure, which at such times is substantially the same as the exhaust back pressure at idle, is stored for use as the reference between said occurrences.

1 Claim, 4 Drawing Figures

ENGINE EXHAUST GAS RECIRCULATION SYSTEM WITH PERIODIC RECALIBRATION OF EXHAUST BACK PRESSURE REFERENCE

BACKGROUND OF THE INVENTION

This invention relates to exhaust gas recirculation systems for motor vehicle combustion engines and particularly such systems utilizing a differential between exhaust back pressure and a control pressure across a flow restricting orifice in the EGR conduit to control the flow of recirculated exhaust gas.

A standard production arrangement for such a system is an exhaust gas recirculation conduit with a flow restricting orifice and an EGR valve downstream therefrom to define a chamber therebetween characterized by a control pressure. Apparatus is provided for comparing the control pressure with a constant pressure reference slightly above atmospheric pressure and controlling the EGR valve to maintain the control pressure constant at the reference value. Since the exhaust back pressure on the upstream side of the orifice varies substantially with the square of engine airflow and the flow through the orifice varies substantially with the square root of the pressure differential across it, the flow through the orifice varies substantially with engine airflow; and the proportion of recirculated exhaust gas to induction air is substantially constant above idle.

It may be found advantageous, however, to be able to vary the proportion of recirculated exhaust gas to induction air in the engine. If the system were modified so that a pressure transducer provided an electrical signal representative of the control pressure and electronic signal processing circuitry controlled the EGR valve in response to the control pressure signal and one or more engine operating variables such as manifold absolute pressure or coolant temperature, a finer control of engine operation would be obtained with possible benefits in the areas of emissions, efficiency of operation or vehicle drivability.

In addition, such a system could allow the use of a control pressure below atmospheric for a greater pressure differential across the orifice which, when used with a smaller orifice size, would provide more accurate control of low exhaust gas recirculation flows while still providing for maximum flow.

However, the use of a pressure transducer to generate an electrical signal may provide a difficulty in controlling exhaust gas recirculation flow at low flow rates. It is generally required that exhaust gas recirculation flow be zero at engine idle, so that the control pressure signal must be equal to a reference voltage representative of exhaust back pressure at idle. A typical pressure transducer, however, is an absolute pressure transducer and may not be sufficiently accurate to guarantee no EGR flow at idle. In addition, the characteristics of the engine or exhaust system which determine exhaust back pressure may change over time, thus producing a different exhaust back pressure at idle and an inaccurate exhaust gas recirculation flow.

SUMMARY OF THE INVENTION

This invention contemplates an exhaust gas recirculation system of the type described above in which provision is made for periodically checking the exhaust back pressure at idle and generating an electrical signal representative thereof by the pressure transducer to be stored as a reference until the next such check. Since the EGR valve will be closed to prevent EGR flow at idle, the control pressure will be approximately equal to the exhaust back pressure and the output of the pressure transducer at that time can itself be stored in a memory as the reference against which the pressure transducer output signal can be compared at times other than engine idle. In a preferred form of this invention, this is accomplished by apparatus which repeatedly calculates from the appropriate variables an EGR valve position signal for applicaion to EGR valve position control means and, before each calculation, compares a selected engine variable such as engine speed with a reference to determine an idle condition and, if such condition exists, causes the stored reference value to be changed to the output of the pressure transducer at that moment.

Further details and advantages of this invention will be apparent from the accompanying drawings and following description of a preferred embodiment.

DESCRIPTION OF THE PREFERRED EMBODIMENT

Figure 1:
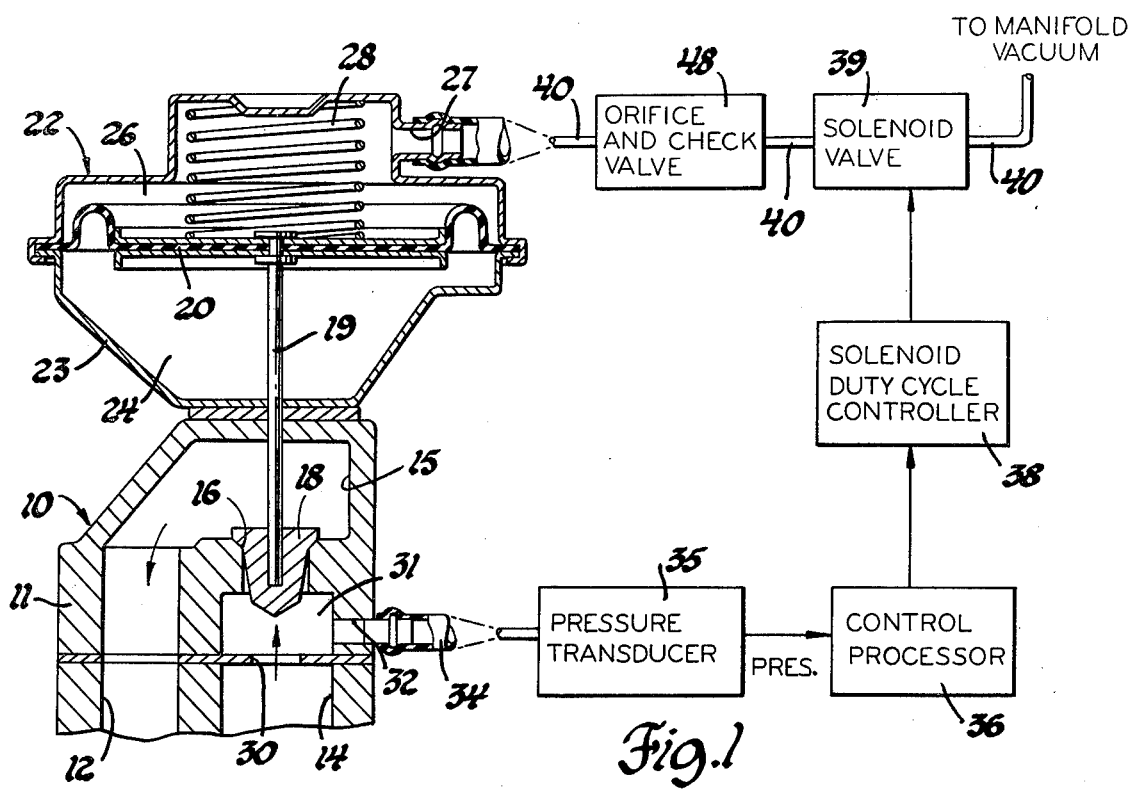
FIG. 1 shows an exhaust gas recirculation system according to this invention.

Referring to FIG. 1, a motor vehicle combustion engine 10 includes an intake manifold 11 having an intake air passage 12 and an exhaust cross-over passage 14. The intake passage 12 and exhaust passage 14 are capable of communication through an EGR conduit 15 having a valve seat 16. A valve member 18 is movable against valve seat 16 to block EGR conduit 15 and away from valve seat 16 to permit a variable flow of recirculated exhaust gas from exhaust passage 14 through EGR conduit 15 to intake passage 12. Valve member 18 is attached by a stem 19 to the flexible diaphragm 20 of a differential pressure type valve actuation motor 22. Motor 22 comprises a can 23 divided by diaphragm 20 into a lower chamber 24 at substantially atmospheric pressure and an upper chamber 26 with a port 27 open to a source of variable vacuum. A spring 28 in upper chamber 26 between diaphragm 20 and can 23 biases valve member 18 toward engagement with valve seat 16.

Intake manifold 11 is provided with a flow restricting orifice 30 dividing exhaust passage 14 from EGR conduit 15 and defining control chamber 31 between flow restricting orifice 30 and valve seat 16. The control pressure in control chamber 31 is communicated through a port 32 and conduit 34 to a pressure transducer 35, which generates electrical signal PRES, representative of this pressure, for application to a control processor 36. Control processor 36 generates, from the signal PRES and other inputs, an electrical valve position signal for application to a solenoid duty cycle controller 38 which controls the position of a solenoid valve 39. Solenoid valve 39 controls the communication through a conduit 40 between a source of engine manifold vacuum such as intake passage 12 and port 27 of motor 22.

Thus, the position of valve 18 is controlled by control processor 26 in response, at least, to the control pressure in chamber 31. Due to orifice 30, the rate of exhaust gas recirculation flow through conduit 15 varies substantially with the square root of the difference between the control pressure in chamber 31 and the exhaust back pressure in exhaust passage 14.

Figure 3:
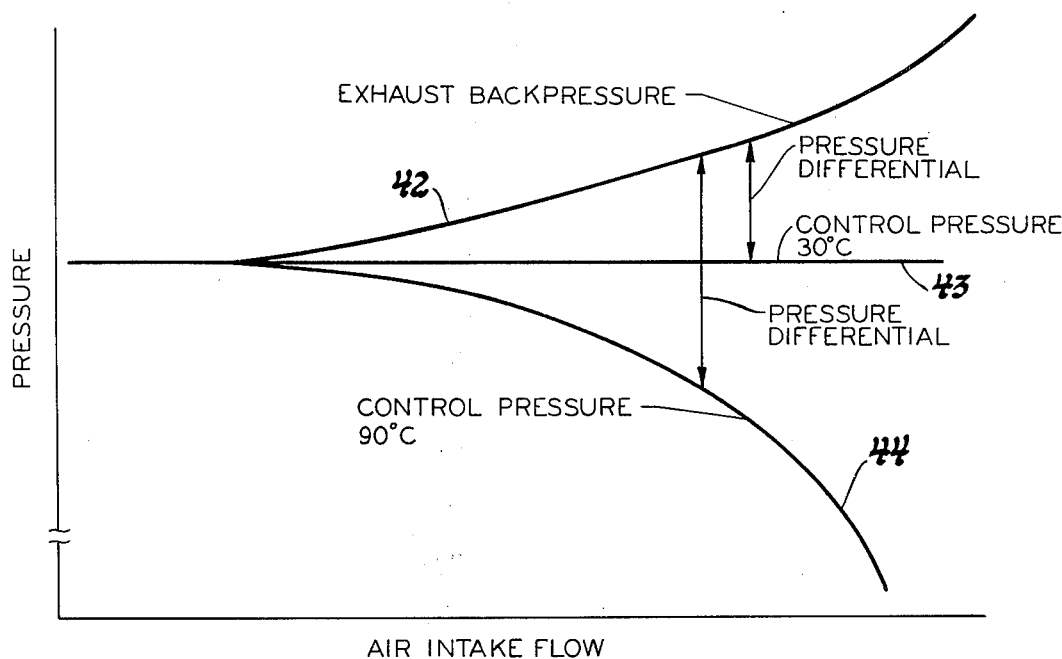
FIGS. 3 and 4 show graphical representations of exhaust back pressure, several control pressures and EGR flows as a function of engine intake airflow.
Figure 4:
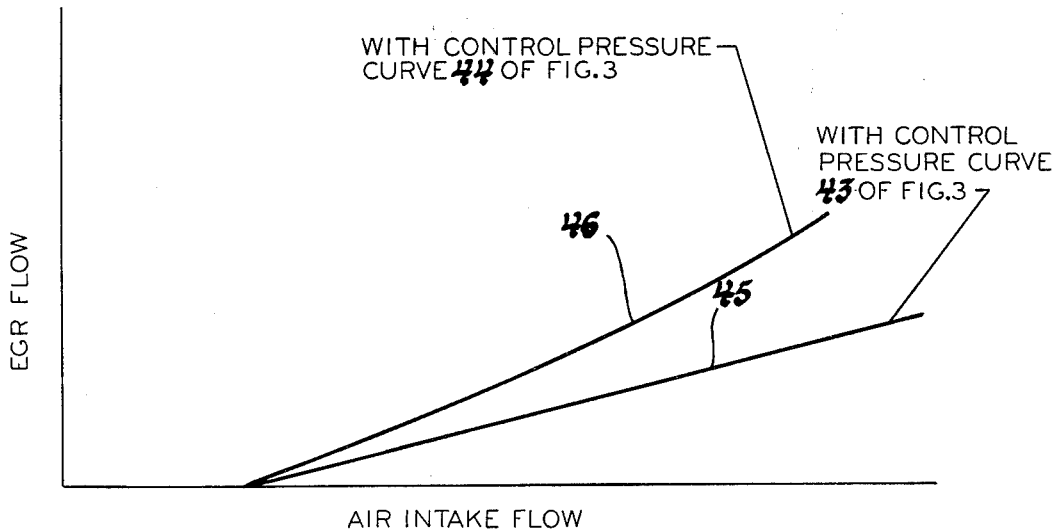

In FIG. 3, curve 42 shows the typical variation of exhaust back pressure as a function of engine intake airflow, which generally depends on engine speed, although it is also partially determined by manifold pressure affecting factors such as throttle position. It can be seen in this figure that the vertical distance, at any given intake airflow, between curve 42 and one of the other curves 43 and 44, which represent possible desired control pressure curves, is representative of the pressure differential across orifice 30 and therefore of exhaust gas recirculation flow rate. The substantially horizontal curve 43 represents a substantially constant control pressure 31 slightly above atmospheric pressure which is the characteristic control pressure curve of the typical mechanical exhaust back pressure type EGR system found on many motor vehicles. Control processor 36 could, of course, be programmed to maintain such a curve. However, control processor 36 may also be constructed or programmed to maintain a control pressure as in curve 44 or, for that matter, almost any other imaginable curve. In fact, in the preferred embodiment, curve 43 represents the control pressure versus airflow curve at e.g., 30° C. engine coolant temperature; curve 44 may be used at 90° C.; and similar curves, slightly different in shape and position, are provided at other engine coolant temperatures. The resulting EGR flows are seen, by way of example, as curves 45 and 46 in FIG. 4.

In order to produce an accurate EGR flow, the signal output of pressure transducer 35 is referenced at all times to the exhaust back pressure at idle as represented in the signal output of pressure transducer 35 at idle. Otherwise, different sensors which put out slightly different signal voltage outputs at the same pressure or exhaust conduits which change the back pressure characteristics with age or condition might shift the curves vertically far enough to significantly change the EGR flow schedule from that which is desired. It can be seen from the curves of FIGS. 3 and 4 that a small shift in the curves will produce a significant change at low airflows. The referencing is accomplished by sampling the output of the pressure transducer 35 when engine 10 is at idle and storing that signal output for use as a reference by the control processor 36 until it is replaced by a new reference at the next selected engine idle condition.

Figure 2:
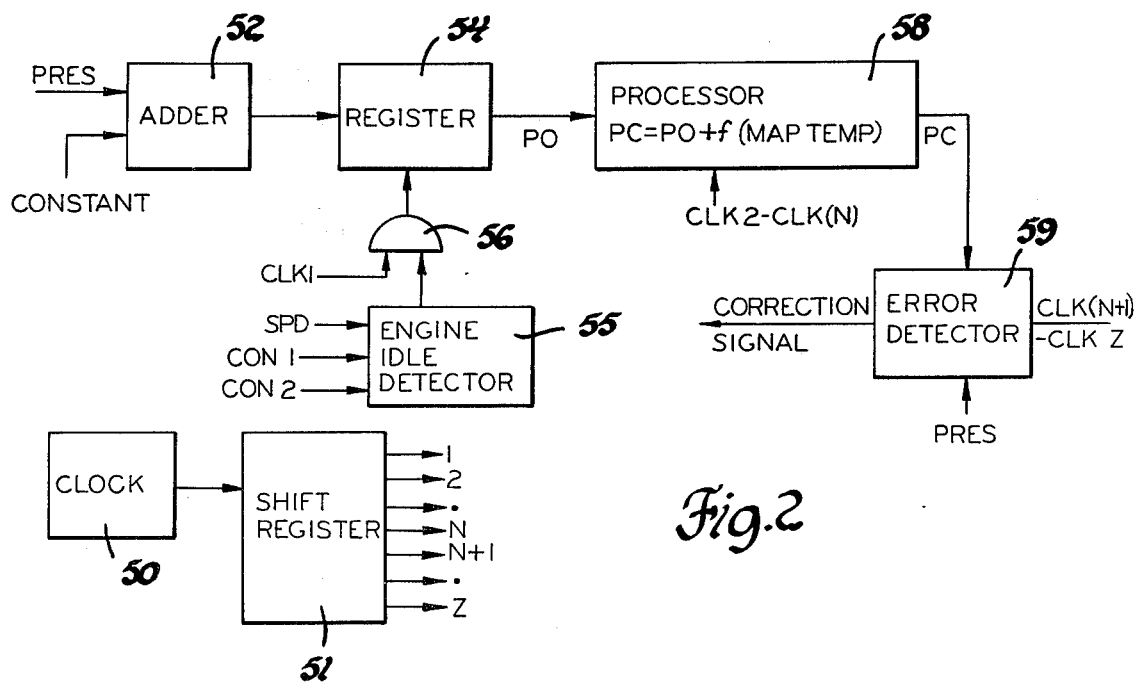
FIG. 2 shows an embodiment of a control processor for use in the system of FIG. 1.

FIG. 2 shows a block diagram of a control processor for use as control processor 36 in FIG. 1. It is understood that this processor may take the form of discrete components as shown in the blocks of FIG. 2 or as equivalent components in a general purpose digital computer which has been programmed to effectively connect some of its components in a similar manner. The choice of apparatus would depend on the precise circumstances of manufacture and cost; and therefore the apparatus is shown as discrete elements for the sake of simplicity. It would be obvious to a proficient programmer provided with this description to program any specific digital computing apparatus with which he was familiar to perform the same functions.

Referring to FIG. 2, a clock 50 provides clock pulses at a specified rate to a shift register 51 which has a plurality of output lines numbered 1 through Z and which is effective to generate a high output on each of lines 1 through Z in turn, shifting from each line N to the next line N + 1 with each clock pulse of clock 50. The shift from output line Z is to output line 1 so that the sequence is repeated indefinitely. Shift register 51 provides actuation and timing control for the remainder of the apparatus shown in FIG. 2.

An adder or summer 52 receives the signal PRES and adds it to a predetermined constant and supplies the sum to the input of the register 54. If the apparatus is digital in nature, adder 52 will, of course, include some form of analog to digital signal conversion which would be present in the input/output section of a computer system.

An engine idle detector 55 receives an engine speed signal SPD and, if desired, one or more other signals CON1, CON2 representing engine or vehicle operating conditions. When the signals received by engine idle detector 55 indicate an engine idle condition, a high output is provided to one input of an AND gate 56 which receives, at its other input, a signal CLK1 from output line 1 of shift register 51. If the output of engine idle detector 55 is high, from an engine idle condition, at the time of the pulse CLK1, AND gate 56 generates a high output to register 54 to cause it to read and store the output of adder 52 as a reference labeled P0 in FIG. 2.

The output of register 54 is provided to a processor 58 which contains apparatus to generate from the reference P0 and certain inputs corresponding to engine operating conditions a control pressure shown as PC in FIG. 2. Clock pulses CLK2 through CLKN are obtained by processor 58 from output lines 2 through N of shift register 51 to control the various elements or steps in the derivation of the desired control pressure PC. The specific method of determining the desired control pressure, and therefore the specific apparatus for doing so, are not critical to this disclosure; however, this specific embodiment shows the desired control pressure PC generally as the sum of the reference P0 and some function "f" of two engine variables: manifold absolute pressure (MAP) and engine coolant temperature (TEMP). In practice, a finite number of temperatures covering a useful engine operating range may be chosen and an engine tested to determine the desired curve of control pressure versus manifold absolute pressure or induction airflow at each of the discrete engine coolant temperatures. The resulting collection of desired curves may be stored in numerical form in apparatus such as a read only memory in processor 58. Other methods of determining the desired control pressure PC will undoubtedly occur to those skilled in the art.

The output of processor 58, which represents a desired control pressure, is provided to error detector apparatus 59 where it is compared with the actual control pressure PRES to generate a correction signal for application to solenoid duty cycle controller 38 in FIG. 1. Clock signals CLK (N + 1) through CLKZ are obtained from the output lines N + 1 through Z of shift register 51 for controlling and timing the apparatus included in error detector 59. Of course, those skilled in the art will be aware of numerous specific ways of generating a correction signal from a desired control pressure and an actual control pressure from the simplest case involving a simple subtraction with an error signal to complex methods using various types of integral and differential corrections. This invention is not meant to be confined to any one or more of these methods; practically any such method can be used within the scope of this invention.

In operation, each cycle of shift register 51 produces first a check for an engine idle condition and storage of a new reference if such engine idle condition exists and then a series of steps to generate a desired control pressure and a correction signal for application to solenoid duty cycle controller 38. In the absence of an engine idle condition for several cycles, the last stored number in register 54 is retained as the reference until the next engine idle condition. If it is not desired to change the reference with each engine idle condition, or if it is not desired to change the reference with each cycle of shift register 51 during a single engine idle condition, an additional input could be provided to AND gate 56 for some other condition chosen by the designer as an additional necessary condition for a rechecking of the reference.

Vacuum conduit 40 is shown in FIG. 1 to be provided with an orifice and check valve assembly 48. This may be used, if necessary, to equalize the build-up and decay rates for vacuum in the motor 22 in the normal manner familiar to those skilled in the art. A check valve would provide airflow in one direction but force airflow in the other direction through a flow restricting orifice. If the vacuum charge and discharge rates are so equalized, the system will be more linear with more effective control.

Although a preferred embodiment is shown and described above, equivalent embodiments will occur to those skilled in the art. Therefore this invention should be limited only by the claim which follows.

The embodiments of the invention in which an exclusive property or privilege is claimed are defined as follows:

1. In a motor vehicle combustion engine having an induction conduit, an exhaust conduit characterized by an exhaust pressure therein and an EGR conduit effective to selectively return a portion of the exhaust gas from the exhaust conduit to the induction conduit through a flow-restricting orifice and an EGR which define a chamber therebetween characterized by a control pressure therein, the flow of exhaust gas through the EGR conduit depending on the difference between the control pressure and the exhaust pressure, the improvement comprising:

means for sensing the control pressure;

means effective to control the EGR valve in response to the sensed control pressure, a determined desired control pressure and a reference, said means being further effective to close the EGR valve during engine idle; and means effective at selected occurrences of engine idle to store the valve of the sensed control pressure for use as the reference between said occurrences, whereby the EGR valve control means is periodically recalibrated during engine operation with reference to the exhaust pressure at engine idle.

* * * * *

UNITED STATES PATENT AND TRADEMARK OFFICE
CERTIFICATE OF CORRECTION

PATENT NO. : 4,142,495
DATED : March 6, 1979
INVENTOR(S) : John E. Lahiff

It is certified that error appears in the above-identified patent and that said Letters Patent are hereby corrected as shown below:

Column 2, line 67, "26" should read -- 36 --.

Column 6, claim 1, line 11, after "EGR" insert -- valve --.

Signed and Sealed this

Seventeenth Day of July 1979

[SEAL]

Attest:

LUTRELLE F. PARKER
*Attesting Officer*    *Acting Commissioner of Patents and Trademarks*